(12) United States Patent
Maeda

(10) Patent No.: US 9,200,678 B2
(45) Date of Patent: Dec. 1, 2015

(54) GEAR COUPLING

(75) Inventor: Shinsaku Maeda, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 0 days.

(21) Appl. No.: 14/239,957

(22) PCT Filed: Sep. 7, 2011

(86) PCT No.: PCT/JP2011/070383
§ 371 (c)(1),
(2), (4) Date: Feb. 20, 2014

(87) PCT Pub. No.: WO2013/035172
PCT Pub. Date: Mar. 14, 2013

(65) Prior Publication Data
US 2014/0194214 A1    Jul. 10, 2014

(51) Int. Cl.
*F16D 3/18* (2006.01)

(52) U.S. Cl.
CPC ...................... *F16D 3/185* (2013.01)

(58) Field of Classification Search
CPC ................................ F16D 1/185; F16D 3/185
USPC .............. 464/16, 153, 154, 158, 159; 105/96, 105/96.2; 295/39, 40
See application file for complete search history.

(56) References Cited

U.S. PATENT DOCUMENTS

| | | | | |
|---|---|---|---|---|
| 1,641,669 A | * | 9/1927 | Fast | 464/154 |
| 1,839,799 A | * | 1/1932 | Morgan | 464/16 |
| 2,873,589 A | * | 2/1959 | Crankshaw | 464/158 |
| 3,712,080 A | * | 1/1973 | Shigeura | 464/154 |
| 4,268,231 A | * | 5/1981 | Corwin et al. | 464/154 X |

(Continued)

FOREIGN PATENT DOCUMENTS

| | | |
|---|---|---|
| DE | 295 08 896 U1 | 11/1996 |
| JP | 49-122249 | 10/1974 |

(Continued)

OTHER PUBLICATIONS

International Search Report (PCT/ISA/210) mailed on Dec. 13, 2011, by the Japanese Patent Office as the International Searching Authority for International Application No. PCT/JP2011/070383.

(Continued)

*Primary Examiner* — Gregory Binda
(74) *Attorney, Agent, or Firm* — Buchanan Ingersoll & Rooney PC

(57) ABSTRACT

A gear coupling includes first and second inner cylinders, first and second outer cylinders, and first and second closing plates interposed between the first and second inner cylinders and closing inner end faces of the first and second outer cylinders. In the first closing plate, one or a plurality of through-holes communicating with a device outer side of the first closing plate from a first grease chamber surrounded by the first inner cylinder, the first outer cylinder, and the first closing plate are formed. In the second closing plate, one or a plurality of through-holes communicating with a device outer side of the second closing plate from a second grease chamber surrounded by the second inner cylinder, the second outer cylinder, and the second closing plate are formed. Plugging members closing the through-holes are fitted to the through-holes.

6 Claims, 4 Drawing Sheets

(56) References Cited

U.S. PATENT DOCUMENTS

| | | | |
|---|---|---|---|
| 4,913,060 A | * | 4/1990 | Sekine et al. .................. 105/96 |
| 6,196,922 B1 | | 3/2001 | Hantschk et al. |
| 6,283,869 B1 | | 9/2001 | Spensberger |

FOREIGN PATENT DOCUMENTS

| | | |
|---|---|---|
| JP | 54-151753 A | 11/1979 |
| JP | 04-312214 A | 11/1992 |
| JP | 07-259874 A | 10/1995 |
| JP | 2000-503750 A | 3/2000 |
| JP | 2006-083962 A | 3/2006 |
| JP | 2008-275083 A | 11/2008 |
| JP | 2009-008114 A | 1/2009 |

OTHER PUBLICATIONS

Notice of Rejection in Office Action for JP 2012-515845 dated May 8, 2012 and English Translation (7 pages).

European Communication and Supplementary Search Report dated Jun. 18, 2015 issued in the corresponding European Patent Application No. 11872033.3-1756 (7 pages).

Chinese First Office Action dated Jun. 30, 2015 issued in the corresponding Chinese Patent Application No. 201180073258.9 and English translation (10 pages).

* cited by examiner

GEAR COUPLING

FIELD

The present invention relates to a gear type coupling applied to a power transmission system of a mechanical apparatus and, more particularly, to a gear type flexible coupling (a gear coupling) for a railway vehicle.

BACKGROUND

A driving apparatus for a railway vehicle is configured to include electric motors set in a truck frame, axles rotatably set in the truck frame and having wheels disposed at both ends, and transmission gears each of which is coupled to the electric motor and the axle and configured to reduce the rotating speed of the electric motor and transmit a driving force to the axle. The torque of the electric motor is transmitted to the transmission gear via a gear coupling and decelerated to a predetermined value by the transmission gear.

A gear coupling in the past represented by Patent Literature 1 described below is configured to concentrically fasten, with a plurality of bolts, two outer cylinders, in which internal tooth gears meshing with external tooth gears respectively provided at a shaft end of a driving shaft of an electric motor and a shaft end of a small gear shaft (a driven shaft) of a transmission gear are formed, thereby being capable of securing reliable transmission of power even when a deflection occurs between the driving shaft and the driven shaft.

CITATION LIST

Patent Literature

Patent Literature 1: Japanese Patent Application Laid-Open No. 2006-83962 (FIG. 1, etc.)

SUMMARY

Technical Problem

However, in the gear coupling of the related art represented by Patent Literature 1 described above, grease for lubrication filling a space between inner cylinders and the outer cylinders is supplied to very small gaps (backlashes) in meshing portions of the external tooth gears and the internal tooth gears. Therefore, for example, when the outer cylinders are pulled out from the inner cylinders during an inspection of the gear coupling, a flow of the air about to flow into the device from the meshing portions according to the pull-out of the outer cylinders is prevented by the grease adhering to the meshing portions. When the outer cylinders are combined with the inner cylinders during assembly of the gear coupling, a flow of the air discharged to the outside of the device from the meshing portions according to the assembly of the outer cylinders is prevented by the grease adhering to the meshing portions. In this way, a force for preventing the pull-out or the push-in of the outer cylinders acts on the outer cylinders. Therefore, a large force is required in attaching and detaching the outer cylinders. There is a problem in that workability in assembly or maintenance of the gear coupling is low.

The present invention has been devised in view of the above and it is an object of the present invention to obtain a gear coupling in which outer cylinders can be easily attached and detached.

Solution to Problem

In order to solve the above problems and achieve the object, the present invention includes a first inner cylinder provided at a shaft end of a driving shaft and including an external tooth gear; a first outer cylinder including an internal tooth gear meshing with the external tooth gear; a second inner cylinder provided at a shaft end of a driven shaft and including an external tooth gear; a second outer cylinder including an internal tooth gear meshing with the external tooth gear; a first closing plate interposed between the first inner cylinder and the second inner cylinder and closing an end face of the first outer cylinder in a direction in which the first outer cylinder and the second outer cylinder are opposed to each other; and a second closing plate interposed between the first inner cylinder and the second inner cylinder and closing an end face of the second outer cylinder in the direction, wherein in the first closing plate, one or a plurality of through-holes communicating with a device outer side of the first closing plate from a first space surrounded by the first inner cylinder, the first outer cylinder, and the first closing plate are formed, in the second closing plate, one or a plurality of through-holes communicating with a device outer side of the second closing plate from a second space surrounded by the second inner cylinder, the second outer cylinder, and the second closing plate are formed, and a plugging member closing the through-holes is fitted to each of the through-holes.

Advantageous Effects of Invention

According to the present invention, in the closing plates interposed on the surfaces on which the two outer cylinders are opposed to each other, the through-holes communicating with the device outer side of the closing plates from the grease chambers are provided. Therefore, there is an effect that it is possible to easily attach and detach the outer cylinders.

DESCRIPTION OF EMBODIMENTS

An embodiment of a gear coupling according to the present invention is explained in detail below based on the drawings. Note that the present invention is not limited by the embodiment.

Embodiment

Figure 1:
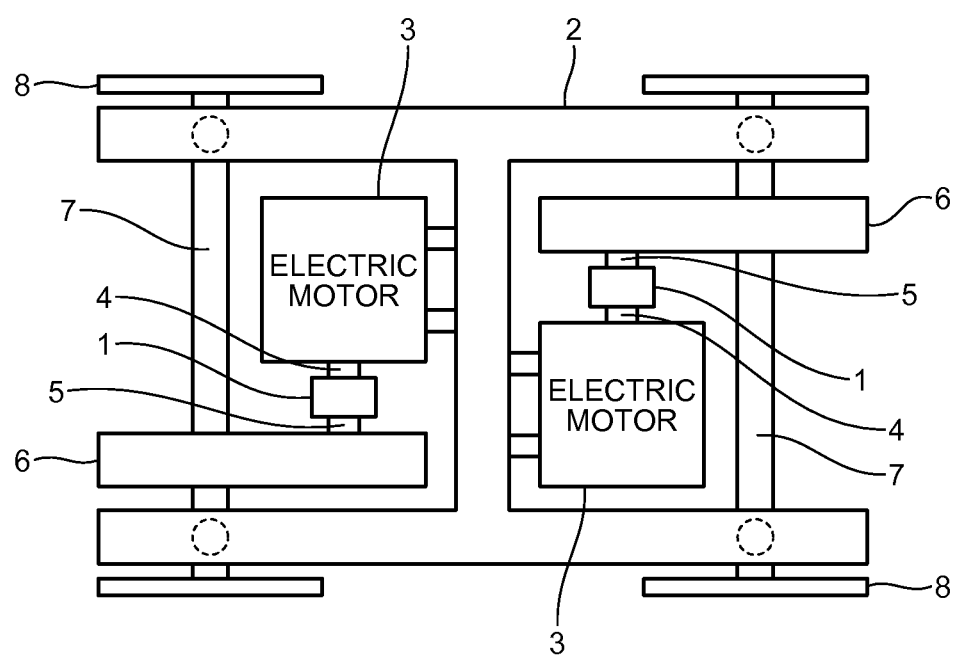
FIG. 1 is a diagram schematically showing a vehicle driving apparatus in which gear couplings according to an embodiment of the present invention are set.
Figure 2:
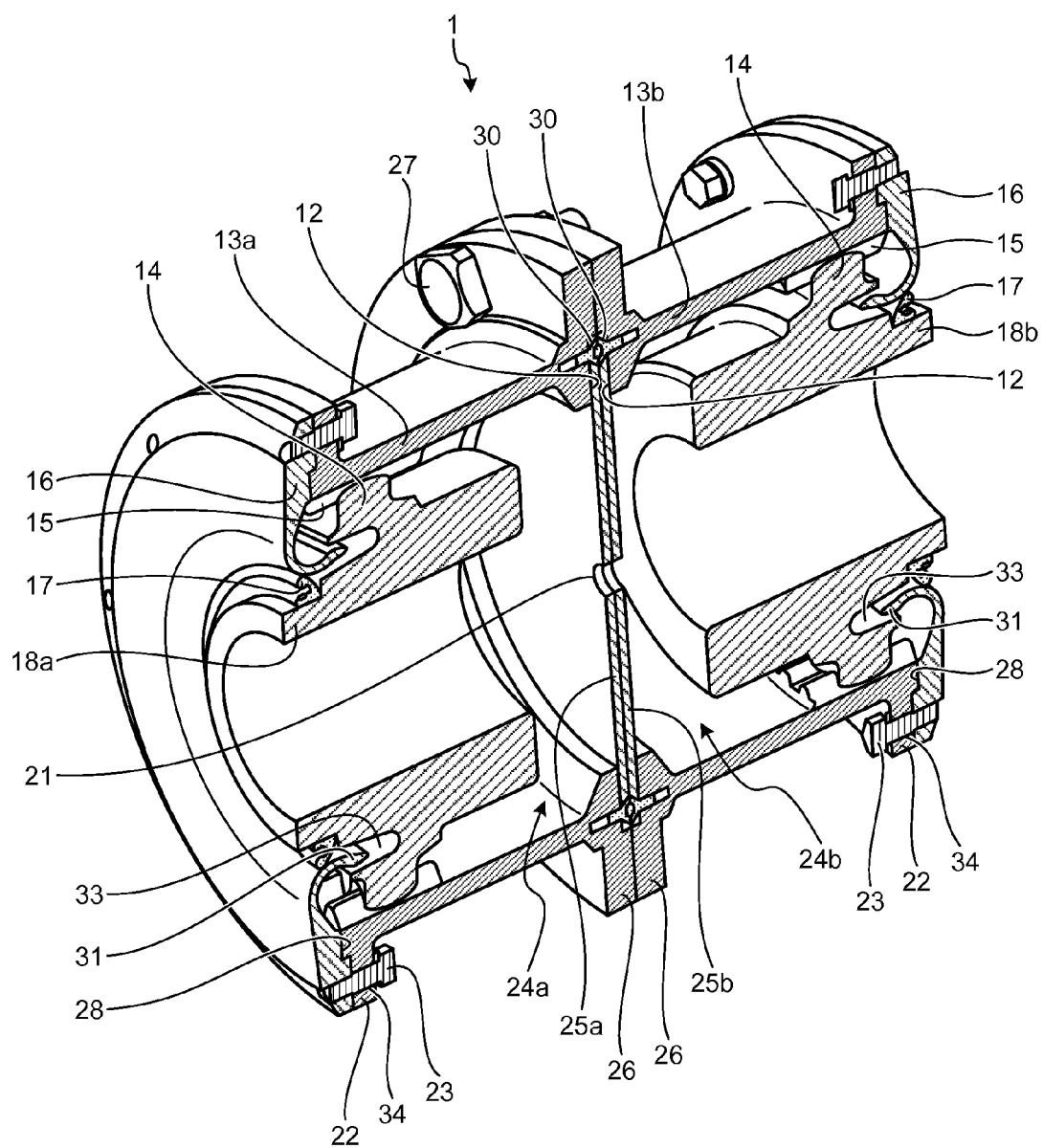
FIG. 2 is a perspective view of the gear coupling shown in FIG. 1.
Figure 3:
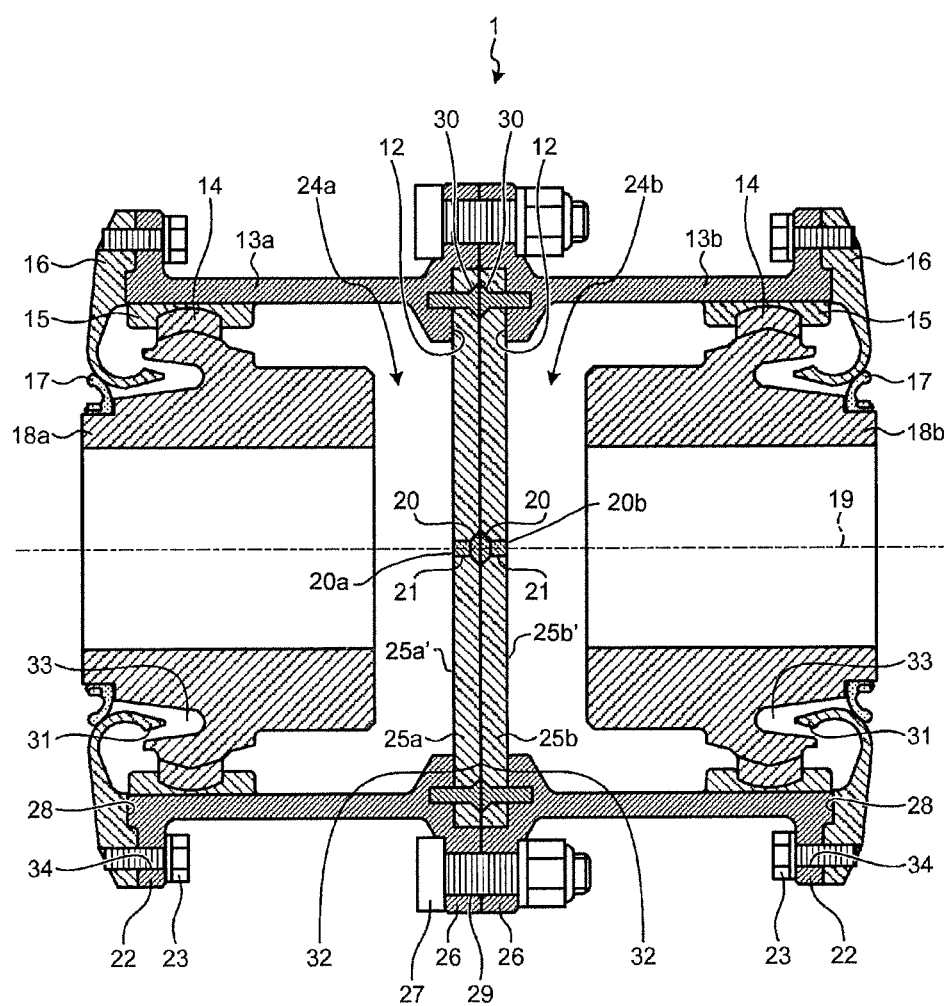
FIG. 3 is a longitudinal sectional view of the gear coupling shown in FIG. 1.

FIG. 1 is a diagram schematically showing a vehicle driving apparatus in which gear couplings 1 according to an embodiment of the present invention are set. FIG. 2 is a perspective view of the gear coupling 1 shown in FIG. 1. FIG. 3 is a longitudinal sectional view of the gear coupling shown in FIG. 1.

In FIG. 1, the vehicle driving apparatus is configured to include electric motors 3 set in a truck frame 2, large gear axles 7 rotatably set in the truck frame 2 and having wheels 8 provided at both ends, and transmission gears 6 each of which is coupled to the electric motor 3 and the large gear axle 7 and configured to reduce the rotating speed of the electric motor 3 and transmit a driving force to the large gear axle 7.

A driving shaft 4, which is a rotating shaft of the electric motor 3, and a driven shaft 5, which is a small gear shaft of the transmission gear 6, are flexibly coupled by the gear coupling 1. The rotation torque of the electric motor 3 is transmitted to the transmission gear 6 via the gear coupling 1 and the large gear axle 7 and the wheels 8 are driven to rotate.

In FIG. 2 and FIG. 3, the gear coupling 1 is configured to include, as main components, an inner cylinder 18a (a first inner cylinder) provided at a shaft end (not shown in the figure) of the driving shaft 4 and including an external tooth gear 14, an outer cylinder 13a (a first outer cylinder) including an internal tooth gear 15 meshing with the external tooth gear 14, an inner cylinder 18b (a second inner cylinder) provided at a shaft end (not shown in the figure) of the driven shaft 5 and including the external tooth gear 14, an outer cylinder 13b (a second outer cylinder) including the internal tooth gear 15 meshing with the external tooth gear 14, a closing plate 25a (a first closing plate) interposed between the inner cylinder 18a and the inner cylinder 18b and closing an inner end face 12 of the outer cylinder 13a in a direction in which the outer cylinder 13a and the outer cylinder 13b are opposed to each other, and a closing plate 25b (a second closing plate) interposed between the inner cylinder 18a and the inner cylinder 18b and closing the inner end face 12 of the outer cylinder 13b in the direction in which the outer cylinder 13a and the outer cylinder 13b are opposed to each other.

In the outer cylinder 13a and the outer cylinder 13b, the internal tooth gears 15 meshing with the external tooth gears 14 disposed along the circumferential direction on the respective outer circumferential surfaces of the inner cylinder 18a and the inner cylinder 18b are formed.

The closing plate 25a and the closing plate 25b are respectively detachably fixed by fastening members 30 (e.g., countersunk head bolts) screwed in toward the inner end face 12.

A space surrounded by the inner cylinder 18a, the outer cylinder 13a, and the closing plate 25a is filled with grease for lubrication. In the following explanation, this space is referred to as a grease chamber 24a (a first space). Similarly, a space surrounded by the inner cylinder 18b, the outer cylinder 13b, and the closing plate 25b is referred to as a grease chamber 24b (a second space). Note that the gear coupling 1 is required to have flexibility in terms of an angle such that reliable transmission of power can be secured even when misalignment of several millimeters or more is present between the driving shaft 4 and the driven shaft 5. Therefore, machining called crowning (machining for providing a moderate bulge in a tooth trace direction) is applied to tooth tips or tooth surfaces of any one of the internal tooth gears 15 and the external tooth gears 14. Grease from the grease chambers 24a and 24b is supplied to meshing portions of the external tooth gears 14 and the internal tooth gears 15.

On the outer circumferential surfaces of the outer cylinders 13a and 13b, inner end flanges 26 vertically provided in a rotating direction of the outer cylinders 13a and 13b on the inner end face 12 side and having a plurality of through-holes 29 formed therein and outer end flanges 22 vertically provided in the rotating direction of the outer cylinders 13a and 13b on the side of outer end faces 28 and having a plurality of through-holes 34 formed therein are provided. For example, the inner cylinder 18a shown on the left side of FIG. 3 is attached to the driving shaft 4. The inner cylinder 18b shown on the right side of FIG. 3 is attached to the driven shaft 5. When the outer cylinders 13a and 13b are connected, fastening members 27 (e.g., bolts) are inserted into the through-holes 29 in a state in which a central axis 19 of the outer cylinder 13a and the central axis 19 of the second outer cylinder 13b are aligned on a straight line. The fastening members 27 are fastened, whereby the outer cylinders 13a and 13b are connected to be capable of transmitting a rotation torque of the electric motor 3 to the transmission gear 6.

On the outer end flanges 22, annular covers 16 fitted by fastening members 23 (e.g., bolts) inserted into the through-holes 34 formed in the outer end flanges 22 are disposed. Ends 31 on the inner circumference side of the covers 16 are extended in the central axis direction from the outer end flanges 22. The ends 31 are formed in a shape bent in a U-shape to the side of grooves 33 formed in outer side surfaces of the inner cylinders 18a and 18b while encapsulating the external tooth gears 14.

In the inner cylinders 18a and 18b, seal members 17 formed in an annular shape, fit in the ends of the inner cylinders 18a and 18b, and biasing the covers 16 in the outer circumferential direction (a direction from the central axis 19 to the outer cylinders 13a and 13b) are provided. Therefore, the outer surfaces of bent portions of the covers 16 are pressed by the seal members 17. Consequently, the inside of the gear coupling 1 is sealed and sealability (which means that a leak of the grease with which the grease chambers 24a and 24b are filled and intrusion of dust from the outside are prevented) is secured. Even when a deflection occurs in the gear coupling 1 and the inner cylinders 18a and 18b move outward or inward, a compression-bonded state of the covers 16 and the seal members 17 is maintained by a biasing force from the seal members 17.

Next, the closing plate 25a and the closing plate 25b are explained. In the closing plate 25a, one or a plurality of through-holes 21 communicating with a device outer side of the closing plate 25a from the grease chamber 24a are formed. In the closing plate 25b, one or a plurality of through-holes 21 communicating with a device outer side of the closing plate 25b from the grease chamber 24b are also formed. Further, plugging members 20 for closing the through-holes 21 are fitted to the through-holes 21.

In the closing plates 25a and 25b shown in FIG. 2 and FIG. 3, as an example, one through-hole 21 is formed in a position where the central axis 19 passes. The through-hole 21 is a flow path of the grease or the air flowing out to the device outer sides of the closing plates 25a and 25b from the grease chambers 24a and 24b or flowing into the grease chambers 24a and 24b side from the closing plates 25a and 25b.

The plugging members 20 are inserted from surfaces 32 on which the closing plates 25a and 25b are opposed to each other to prevent the flow of the grease or the air flowing out to the device outer sides of the closing plates 25a and 25b from the grease chambers 24a and 24b and prevent the flow of the air flowing into the grease chambers 24a and 24b from the device outer sides of the closing plates 25a and 25b. For example, when countersunk head fastening members are used as the plugging members 20, attachment and detachment of the plugging members 20 are facilitated. FIG. 3 shows that a tip 20a of a screw section of the plugging member 20 fitted to the closing plate 25a is located on a first closing plate side 25a' with respect to a boundary between the closing plate 25a and the grease chamber 24a. Similarly, a tip 20b of a screw section of the plugging member 20 fitted to the closing plate 25b is located on a second closing plate side 25b' with respect to a boundary between the closing plate 25b and the grease chamber 24b. Further, it is possible to reduce the possibility of dropping of the plugging members 20 due to vibration of the gear coupling 1.

An attachment and detachment procedure for the outer cylinders 13a and 13b and functions of the plugging members 20 and the through-holes 21 are explained.

First of all, an operation for fitting the outer cylinders 13a and 13b to the inner cylinders 18a and 18b is explained. (1) First, the covers 16 are attached to the driving shaft 4 and the driven shaft 5. Thereafter, the inner cylinders 18a and 18b are fitted to the shaft end of the driving shaft 4 and the shaft end of the driven shaft 5. The closing plates 25a and 25b are fitted to the inner end faces 12 of the outer cylinders 13a and 13b using the fastening members 30. The grease chambers 24a and 24b are filled with the grease for lubrication. At this point, it is assumed that the plugging members 20 are not fitted to the through-holes 21.

(2) Subsequently, the outer cylinders 13a and 13b are combined with the inner cylinders 18a and 18b respectively fitted to the shaft end of the driving shaft 4 and the shaft end of the driven shaft 5. At this point, according to the combination of the outer cylinders 13a and 13b with the inner cylinders 18a and 18b, the grease with which the grease chambers 24a and 24b are filled and the air are discharged to the outside of the device through the through-holes 21. Note that, in the related art, the through-holes 21 in the present embodiment are not provided in the closing plates 25a and 25b. Therefore, when the outer cylinders 13a and 13b are combined with the inner cylinders 18a and 18b, gaps in meshing portions of the internal tooth gears 15 and the external tooth gears 14 are closed by the grease in the grease chambers 24a and 24b. Thus, a flow of the grease or the air discharged to the outside of the device from the meshing portions according to the combination of the outer cylinders 13a and 13b is prevented. Therefore, because a force for preventing the outer cylinders 13a and 13b from being pushed in acts on the outer cylinders 13a and 13b, it is difficult to combine the outer cylinders 13a and 13b with the inner cylinders 18a and 18b unless a large force is applied thereto. In the closing plates 25a and 25b according to the present embodiment of the present invention, the through-holes 21 communicating with the device outer sides of the closing plates 25a and 25b from the grease chambers 24a and 24b are formed. Therefore, the grease with which the grease chambers 24a and 24b are filled and the air are discharged to the outside of the device through the through-holes 21 according to the combination of the outer cylinders 13a and 13b with the inner cylinders 18a and 18b. Consequently, it is possible to combine the outer cylinders 13a and 13b with the inner cylinders 18a and 18b even if a large force is not applied thereto.

(3) After the combination of the outer cylinders 13a and 13b with the inner cylinders 18a and 18b are completed, the plugging members 20 are fitted to the through-holes 21 and the covers 16 are fitted to the outer end flanges 22. After the plugging members 20 are fitted, the outer cylinders 13a and 13b are connected by the fastening members 27.

Note that, because the outer cylinders 13a and 13b are connected by the fastening members 27, it seems unnecessary to close the through-holes 21 with the plugging members 20. However, a reason for closing the through-holes 21 is that, because the flow of the grease or the air from one of the grease chambers 24a and 24b to the other of the grease chambers 24a and 24b is prevented, a damper effect (an effect of suppressing vibration that occurs between the outer cylinders 13a and 13b and the inner cylinders 18a and 18b according to rotation) by the grease chambers 24a and 24b can be expected.

Next, an operation for detaching the outer cylinders 13a and 13b from the inner cylinders 18a and 18b is explained. (1) First, the fastening members 27 are detached to separate the outer cylinders 13a and 13b and secure a space for enabling the plugging members 20 to be detached. Thereafter, the plugging members 20 are detached from the through-holes 21. The covers 16 fitted to the outer end faces 28 are also detached.

(2) Subsequently, the outer cylinders 13a and 13b are pulled out from the inner cylinders 18a and 18b. At this point, the air on the device outer sides of the closing plates 25a and 25b flows into the grease chambers 24a and 24b through the through-holes 21 according to the pull-out of the outer cylinders 13a and 13b. Note that, in the related art, the through-holes 21 in the present embodiment are not provided in the closing plates 25a and 25b. Therefore, when the outer cylinders 13a and 13b are pulled out, a flow of the air about to flow into the device from the meshing portions of the internal tooth gears 15 and the external tooth gears 14 according to the pull-out of the outer cylinders 13a and 13b is prevented by the grease adhering to the gaps in the meshing portions. Therefore, because a force for preventing the pull-out of the outer cylinders 13a and 13b acts on the outer cylinders 13a and 13b, in the related art, it is difficult to pull out the outer cylinders 13a and 13b from the inner cylinders 18a and 18b unless a large force is applied thereto. In the closing plates 25a and 25b according to the present embodiment of the present invention, the through-holes 21 communicating with the grease chambers 24a and 24b from the device outer sides of the closing plates 25a and 25b are formed. Therefore, because the air on the outside of the device flows into the grease chambers 24a and 24b through the through-holes 21 according to the detachment of the outer cylinders 13a and 13b. Thus, it is possible to pull out the outer cylinders 13a and 13b even if a large force is not applied thereto.

As explained above, in the closing plate 25a of the gear coupling 1, the through-hole 21 is formed in the position where the central axis 19 of the outer cylinder 13a passes. In the closing plate 25b of the gear coupling 1, the through-hole 21 is formed in the position where the central axis 19 of the outer cylinder 13b passes. Therefore, it is possible to easily disassemble the gear coupling 1.

Figure 4:
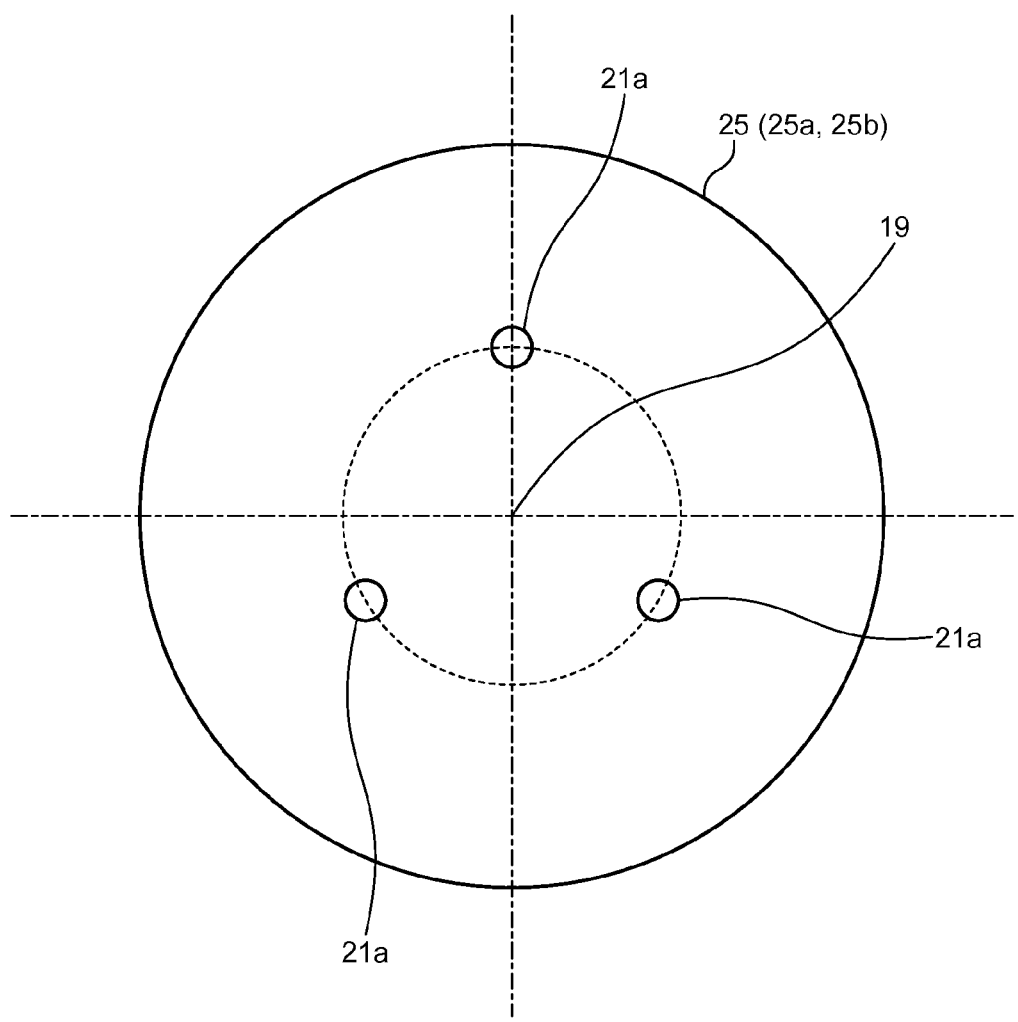
FIG. 4 is a diagram for explaining another example of through-holes formed in closing plates.

Note that through-holes explained below may be provided instead of the through-holes 21. FIG. 4 is a diagram for explaining another example of the through-holes 21 formed in the closing plates 25a and 25b. In the closing plates 25a and 25b shown in FIG. 4, a plurality of (e.g., three) through-holes 21a provided on a concentric circle centering on the central axis 19 and in positions symmetrical to each other with respect to the central axis 19 are formed. Note that, when the through-holes 21a are provided as shown in FIG. 4, the plugging members 20 are respectively fitted to the through-holes 21a.

By providing the through-holes 21a in the symmetrical positions in this way, equalization of a circumferential balance of the closing plates 25a and 25b is attained; therefore, it is possible to suppress vibration of the gear coupling 1. Further, a flow amount of the air or the grease flowing through the through-holes 21a is larger than a flow amount of the air or the grease flowing through one through-hole 21. Therefore, it is possible to attain further improvement of attaching and detaching workability of the outer cylinders 13a and 13b.

Note that, in the example explained above, one through-hole 21 is formed in the position where the central axis 19 of the outer cylinders 13a and 13b passes or a plurality of through-holes 21 are formed on the concentric circle centering on the central axis 19 and in the positions symmetrical to each other with respect to the central axis 19. However, the positions of the through-holes 21 are not limited to this. For example, one or a plurality of through-holes 21 may be provided in arbitrary positions further on the outer circumference side of the position where the central axis 19 of the outer cylinders 13a and 13b passes. In this case, although the circumferential balance of the closing plates 25a and 25b due to the machining of the through-holes 21 and the attachment of the plugging members 20 is slightly deteriorated, it is possible to easily attach and detach the outer cylinders 13a and 13b compared with the related art.

Note that, in the example explained in the present embodiment, the through-hole 21 provided in the closing plate 25a and the through-hole 21 provided in the closing plate 25b are each formed in the position where the central axis 19 of the outer cylinder 13b passes or the through-holes 21 provided in the closing plate 25a and the through-holes 21 provided in the closing plate 25b are each formed on the concentric circle centering on the central axis 19 and in the positions symmetrical to each other with respect to the central axis 19. However, the through-holes 21 are not limited to this and may be configured as explained below.

For example, the through-hole 21 provided in the closing plate 25a may be formed in the position where the central axis 19 of the outer cylinder 13a passes and a plurality of through-holes 21 provided in the closing plate 25b may be formed on the concentric circle centering on the central axis 19 of the outer cylinder 13b and in the positions symmetrical to each other with respect to the central axis 19.

Further, a plurality of through-holes 21 provided in the closing plate 25a may be formed on the concentric circle centering on the central axis 19 of the outer cylinder 13a and in the positions symmetrical to each other with respect to the central axis 19 and the through-hole 21 provided in the closing plate 25b may be formed in the position where the central axis 19 of the outer cylinder 13b passes.

Note that the plugging members 20 are not limited to the countersunk head fastening members and it is satisfactory that the plugging members 20 are members that can close the through-holes 21 and have a shape that does not form a gap between the surfaces 32 on which the closing plates 25a and 25b are opposed to each other when the outer cylinders 13a and 13b are connected. The plugging members 20 may be members other than the fastening members. Because the plugging members 20 are not allowed to intrude into the grease chambers 24a and 24b, the plugging members 20 are desirably, for example, fixed objects made of metal.

Note that the through-holes 21 according to the present embodiment are reversible holes that allow the grease in the grease chambers 24a and 24b or the air to pass to the device outer sides of the closing plates 25a and 25b and allow the air on the device outer sides of the closing plates 25a and 25b to pass to the insides of the grease chambers 24a and 24b and are not irreversible holes. The irreversible holes mean, for example, holes configured to be capable of causing the grease chambers 24a and 24b to be filled with the grease from the device outer sides of the closing plates 25a and 25b and capable of suppressing the grease with which the grease chambers 24a and 24b are filled from flowing out to the outside of the device. That is, if the through-holes 21 according to the present embodiment are configured as the irreversible holes, for example, a phenomenon occurs in which, when the outer cylinders 13a and 13b are detached from the inner cylinders 18a and 18b, the outer cylinders 13a and 13b can be pulled out even if a large force is not applied thereto but, when the outer cylinders 13a and 13b are combined with the inner cylinders 18a and 18b, the outer cylinders 13a and 13b cannot be combined unless a large force is applied thereto. The through-holes 21 according to the present embodiment are not the irreversible holes. Therefore, it is possible to pull out the outer cylinders 13a and 13b and combine the outer cylinders 13a and 13b even if a large force is not applied thereto.

As explained above, the gear coupling 1 according to the embodiment includes the first inner cylinder (the inner cylinder 18a) provided at the shaft end of the driving shaft 4 and including the external tooth gear 14, the first outer cylinder (the outer cylinder 13a) including the internal tooth gear 15 meshing with the external tooth gear 14, the second inner cylinder (the inner cylinder 18b) provided at the shaft end of the driven shaft 5 and including the external tooth gear 14, the second outer cylinder (the outer cylinder 13b) including the internal tooth gear 15 meshing with the external tooth gear 14, the first closing plate (the closing plate 25a) interposed between the inner cylinder 18a and the inner cylinder 18b and closing the inner end face 12 of the outer cylinder 13a in the direction in which the outer cylinder 13a and the outer cylinder 13b are opposed to each other, and the second closing plate (the closing plate 25b) interposed between the inner cylinder 18a and the inner cylinder 18b and closing the inner end face 12 of the outer cylinder 13b in the direction in which the outer cylinder 13a and the outer cylinder 13b are opposed to each other. In the closing plate 25a, one or a plurality of through-holes 21 communicating with the device outer side of the closing plate 25a from the first space (the grease chamber 24a) surrounded by the inner cylinder 18a, the outer cylinder 13a, and the closing plate 25a are formed. In the closing plate 25b, one or a plurality of through-holes 21 communicating with the device outer side of the closing plate 25b from the second space (the grease chamber 24b) surrounded by the inner cylinder 18b, the outer cylinder 13b, and the closing plate 25b are formed. When the outer cylinders 13a and 13b are combined with the inner cylinders 18a and 18b, the grease with which the grease chambers 24a and 24b are filled and the air are discharged to the outside of the device through the through-holes 21. Therefore, it is possible to combine the outer cylinders 13a and 13b even if a large force is not applied thereto. When the outer cylinders 13a and 13b are detached from the inner cylinders 18a and 18b, the air on the outside of the device flows into the grease chambers 24a and 24b through the through-holes 21. Therefore, it is possible to pull out the outer cylinders 13a and 13b even if a large force is not applied thereto.

Note that, in the example explained in the present embodiment, the gear coupling 1 is applied to the vehicle driving apparatus. However, the gear coupling 1 can also be applied to a power transmission mechanism incorporated in vehicles, such as an automobile and an airplane.

The gear coupling 1 according to the present embodiment indicates an example of the content of the present invention. It goes without saying that the gear coupling 1 can be combined with still another publicly-known technology and can be changed, for example, by omitting a part of the gear coupling 1 without departing from the spirit of the present invention.

INDUSTRIAL APPLICABILITY

As explained above, the present invention can be applied to a gear type coupling mainly applied to a power transmission system of a mechanical apparatus and is, in particular, useful as an invention that can easily attach and detach outer cylinders.

REFERENCE SIGNS LIST 1 gear coupling
2 truck frame
3 electric motor
4 driving shaft 5 driven shaft
6 transmission gear
7 large gear axle
8 wheel
12 inner end face
13a outer cylinder (first outer cylinder)
13b outer cylinder (second outer cylinder)
14 external tooth gear
15 internal tooth gear
16 cover
17 seal member
18a inner cylinder (first inner cylinder)
18b inner cylinder (second inner cylinder)
19 central axis
20 plugging member
21, 21a, 29, 34 through-hole
22 outer end flange
23, 27, 30 fastening member
24a grease chamber (first space)
24b grease chamber (second space)
25a closing plate (first closing plate)
25b closing plate (second closing plate)
26 inner end flange
28 outer end face
33 groove
31 end
32 surfaces on which closing plates are opposed to each other

The invention claimed is:

1. A gear coupling for a railway vehicle comprising:
a first inner cylinder configured to be provided at a shaft end of a driving shaft, which is a rotating shaft of an electric motor, and including an external tooth gear;
a first outer cylinder including an internal tooth gear meshing with the external tooth gear;
a second inner cylinder configured to be provided at a shaft end of a driven shaft, which is a small gear shaft of a transmission gear, and including an external tooth gear;
a second outer cylinder including an internal tooth gear meshing with the external tooth gear;
a first closing plate interposed between the first inner cylinder and the second inner cylinder and closing an end face of the first outer cylinder in a direction in which the first outer cylinder and the second outer cylinder are opposed to each other; and
a second closing plate interposed between the first inner cylinder and the second inner cylinder and closing an end face of the second outer cylinder in the direction, wherein
in the first closing plate, one or a plurality of reversible through-holes communicating with a device outer side of the first closing plate from a first space surrounded by the first inner cylinder, the first outer cylinder, and the first closing plate are formed,
in the second closing plate, one or a plurality of reversible through-holes communicating with a device outer side of the second closing plate from a second space surrounded by the second inner cylinder, the second outer cylinder, and the second closing plate are formed,
a plugging member screwed into a surface on which the first closing plate and the second closing plate are opposed to each other and closing the through-holes is fitted to the through-holes formed in the first closing plate,
a plugging member screwed into a surface on which the first closing plate and the second closing plate are opposed to each other and closing the through-holes is fitted to the through-holes formed in the second closing plate,
a tip of a screw section of the plugging member fitted to the first closing plate is located on a first closing plate side with respect to a boundary between the first closing plate and the first space, and
a tip of a screw section of the plugging member fitted to the second closing plate is located on a second closing plate side with respect to a boundary between the second closing plate and the second space.

2. The gear coupling for a railway vehicle according to claim 1, wherein
the through-hole provided in the first closing plate is formed in a position where a central axis of the first outer cylinder passes, and
the through-hole provided in the second closing plate is formed in a position where a central axis of the second outer cylinder passes.

3. The gear coupling for a railway vehicle according to claim 1, wherein
the through-holes provided in the first closing plate are provided on a concentric circle centering on a central axis of the first outer cylinder and in positions symmetrical to each other with respect to the central axis, and
the through-holes provided in the second closing plate are formed on a concentric circle centering on a central axis of the second outer cylinder and in positions symmetrical to each other with respect to the central axis.

4. The gear coupling for a railway vehicle according to claim 1, wherein
the through-hole provided in the first closing plate is formed in a position where a central axis of the first outer cylinder passes, and
the through-holes provided in the second closing plate are formed on a concentric circle centering on a central axis of the second outer cylinder and in positions symmetrical to each other with respect to the central axis.

5. The gear coupling for a railway vehicle according to claim 1, wherein
the through-holes provided in the first closing plate are formed on a concentric circle centering on a central axis of the first outer cylinder and in positions symmetrical to each other with respect to the central axis, and
the through-hole provided in the second closing plate is formed in a position where a central axis of the second outer cylinder passes.

6. The gear coupling for a railway vehicle according to claim 1, wherein the plugging member is a countersunk head fastening member.

* * * * *